(12) United States Patent
Rabe et al.

(10) Patent No.: US 7,737,082 B2
(45) Date of Patent: Jun. 15, 2010

(54) SILOXANE COMPOSITION, AGGLOMERATE, AND METHOD OF PREPARING

(76) Inventors: James Alan Rabe, 1210 Glendale St., Midland, MI (US) 48640; Sefa Yilmaz, 6896 Island Drive S., Saginaw, MI (US) 48603; Patrick Weyburne, 1203 Whispering Oak Dr., Midland, MI (US) 48640

( * ) Notice: Subject to any disclaimer, the term of this patent is extended or adjusted under 35 U.S.C. 154(b) by 594 days.

(21) Appl. No.: 11/659,988

(22) PCT Filed: Aug. 25, 2005

(86) PCT No.: PCT/US2005/030520

§ 371 (c)(1), (2), (4) Date: Feb. 12, 2007

(87) PCT Pub. No.: WO2006/033775

PCT Pub. Date: Mar. 30, 2006

(65) Prior Publication Data

US 2007/0249757 A1   Oct. 25, 2007

Related U.S. Application Data

(60) Provisional application No. 60/611,259, filed on Sep. 17, 2004.

(51) Int. Cl.
*B01J 20/02* (2006.01)
*B01J 20/10* (2006.01)

(52) U.S. Cl. .................. 502/400; 502/402; 502/416; 502/417

(58) Field of Classification Search .............. 524/80, 524/261, 267, 268; 528/10, 42, 38, 43; 502/400, 502/402, 416, 417
See application file for complete search history.

(56) References Cited

U.S. PATENT DOCUMENTS

| | | | |
|---|---|---|---|
| 3,361,583 A * | 1/1968 | Elarde et al. | 264/624 |
| 3,382,574 A * | 5/1968 | Chadwick | 29/610.1 |
| 3,450,672 A * | 6/1969 | Merrill | 528/12 |
| 3,615,272 A | 10/1971 | Collins et al. | |
| 3,676,925 A * | 7/1972 | Sato et al. | 29/613 |
| 3,689,618 A * | 9/1972 | Chadwick | 264/104 |
| 3,901,823 A * | 8/1975 | Dimitri et al. | 502/414 |
| 3,960,761 A * | 6/1976 | Burger et al. | 502/420 |
| 3,969,124 A * | 7/1976 | Stewart | 501/90 |
| 4,664,683 A * | 5/1987 | Degen et al. | 502/402 |
| 4,892,726 A * | 1/1990 | Yonekura et al. | 424/63 |
| 4,999,397 A | 3/1991 | Weiss et al. | |
| 5,010,159 A | 4/1991 | Bank et al. | |
| 5,063,267 A | 11/1991 | Hanneman et al. | |
| 5,731,260 A * | 3/1998 | Abell | 502/416 |
| 5,744,421 A * | 4/1998 | Robinson et al. | 502/416 |
| 6,207,264 B1 * | 3/2001 | Robinson et al. | 428/304.4 |

FOREIGN PATENT DOCUMENTS

| | | |
|---|---|---|
| EP | 0 368 041 A1 | 10/1989 |
| JP | 58-034870 | 3/1983 |
| JP | 59-178-149 | 10/1984 |
| JP | 60-086017 | 5/1985 |
| JP | 62-220772 | 9/1987 |
| JP | 63-107122 | 5/1988 |

* cited by examiner

*Primary Examiner*—Randy Gulakowski
*Assistant Examiner*—Robert Loewe
(74) *Attorney, Agent, or Firm*—Timothy J. Troy

(57) ABSTRACT

A siloxane composition, comprising from 70 to 99 parts by weight of a solid particulate having a median particle size of from 0.1 to 3000 μm and from 1 to 30 parts by weight of a binder having a median particle size of from 5 to 250 μm, wherein the composition is a powder and the binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, $-O-NR^2R^3$, $-OR^2$, $-O-R^4-OR^2$, and an epoxy-substituted organic group, wherein $R^2$ is $C_1$ to $C_8$ hydrocarbyl, $R^3$ is $R^2$ or $-H$, $R^4$ is hydrocarbylene, $w+x+y+z=1$, $y/(w+x+y+z)$ is at least 0.67, and the siloxane resin has a softening point of from 30 to 115° C.; an agglomerate, and a method preparing the agglomerate.

15 Claims, No Drawings

US 7,737,082 B2

SILOXANE COMPOSITION, AGGLOMERATE, AND METHOD OF PREPARING

CROSS-REFERENCE TO RELATED APPLICATIONS

This application is a U.S. national stage filing under 35 U.S.C. §371 of PCT Application No. PCT/US2005/030520 filed on 25 Aug. 2005, which claims the benefit of U.S. Provisional Patent Application No. 60/611,259 filed 17 Sep. 2004 under 35 U.S.C. §119 (e). PCT Application No. PCT/US2005/030520 and U.S. Provisional Patent Application No. 60/611,259 are hereby incorporated by reference.

FIELD OF THE INVENTION

The present invention relates to a siloxane composition comprising a solid particulate and a binder and more particularly to a siloxane composition comprising a solid particulate and a binder comprising a siloxane resin. The present invention also relates to an agglomerate comprising the solid particulate and the binder, and to a method of preparing the agglomerate.

BACKGROUND OF THE INVENTION

Pressure agglomeration processes, such as briquetting, are widely used in numerous industries, including metallurgical, coal, pharmaceutical, and waste treatment, to convert finely divided particulates into solid products of defined size, shape, and density. For example, the solid products or agglomerates can have the form of briquettes, sheets, or pellets, depending on the agglomeration process. The advantages of agglomeration include improved safety, improved handling, and reduced transportation costs, of particulate materials. Moreover, agglomeration can be used in the recycling of waste materials.

Methods of producing agglomerates are well known in the art. Conventional methods typically employ organic binders such as coal tar, clay, starch, waxes, and lignin waste. However, such binders contain substantial levels of impurities and are unsuitable for certain applications, for example, smelting processes, where purity is important. Moreover, conventional binders have relatively low char yields. As a result, agglomerates containing conventional binders often have poor bond strength at temperatures greater than the decomposition temperature of the binder.

Consequently, there is a need for a composition comprising a binder having high purity and high char yield that can be compressed into an agglomerate having high bond strength at elevated temperatures.

SUMMARY OF THE INVENTION

The present invention is directed to a siloxane composition, comprising from 70 to 99 parts by weight of a solid particulate having a median particle size of from 0.1 to 3000 μm and from 1 to 30 parts by weight of a binder having a median particle size of from 5 to 250 μm, wherein the composition is a powder and the binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, $-O-NR^2R^3$, $-OR^2$, $-O-R^4-OR^2$, and an epoxy-substituted organic group, wherein $R^2$ is $C_1$ to $C_8$ hydrocarbyl, $R^3$ is $R^2$ or $-H$, $R^4$ is hydrocarbylene, $w+x+y+z=1$, $y/(w+x+y+z)$ is at least 0.67, and the siloxane resin has a softening point of from 30 to 115° C.

The present invention is also directed to an agglomerate, comprising from 70 to 99 parts by weight of a solid particulate having a median particle size of from 0.1 to 3000 μm and from 1 to 30 parts by weight of a binder having a median particle size of from 5 to 250 μm, wherein the binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, $-O-NR^2R^3$, $-OR^2$, $-O-R^4-OR^2$, and an epoxy-substituted organic group, wherein $R^2$ is $C_1$ to $C_8$ hydrocarbyl, $R^3$ is $R^2$ or $-H$, $R^4$ is hydrocarbylene, $w+x+y+z=1$, $y/(w+x+y+z)$ is at least 0.67, and the siloxane binder has a softening point of from 30 to 115° C.

The present invention is further directed to a method of preparing an agglomerate, comprising compressing a siloxane composition to form an agglomerate, wherein the composition comprises from 70 to 99 parts by weight of a solid particulate having a median particle size of from 0.1 to 3000 μm and from 1 to 30 parts by weight of a binder having a median particle size of from 5 to 250 μm, wherein the composition is a powder and the binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, $-O-NR^2R^3$, $-OR^2$, $-O-R^4-OR^2$, and an epoxy-substituted organic group, wherein $R^2$ is $C_1$ to $C_8$ hydrocarbyl, $R^3$ is $R^2$ or $-H$, $R^4$ is hydrocarbylene, $w+x+y+z=1$, $y/(w+x+y+z)$ is at least 0.67, and the binder has a softening point of from 30 to 115° C.

The siloxane composition of the present invention can be compressed into an agglomerate having a variety of shapes and sizes. The composition contains a siloxane resin binder that has a softening point ($T_S$) well above room temperature. Consequently, the binder, which has the form of a powder at room temperature, softens under compression to form an agglomerate of the solid particulate. Also, compared to conventional organic binders, such as coal tar, clay, starch, waxes, and lignin waste, the siloxane resin binder of the composition has very low content of impurities, for example metals, boron and phosphorus. Further, compared to organic binders, the siloxane resin binder has high char yield and provides a high strength bond with the solid particulate when heated above its decomposition temperature.

The agglomerate of the present invention has sufficient green strength to permit transportation and handling. Also, the agglomerate can have a variety of shapes and sizes. Further, when heated above the decomposition temperature of the siloxane resin binder, approximately 500° C., the agglomerate maintains its shape and has high bond strength, making it suitable for use in high temperature smelting processes.

The method of preparing the agglomerate can be conveniently carried out using conventional equipment, such as roll presses, for example compacting and briquetting systems, stamps and dies, and pellet mills. In particular, roll presses are suitable for the high capacity production of agglomerates. The method can be used to produce agglomerates having a variety of shapes, for example briquettes, sheets, and pellets, depending on the selection of equipment. Also, the method can be carried out without the aid of solvent, external heating, or post-compression drying. Importantly, the method can be used to recover solid particulate waste products from manufacturing processes.

The agglomerates of the present invention have numerous uses, depending on the nature of the solid particulate. In particular, the agglomerates can be used as sources of raw materials in manufacturing processes. For example, agglomerates containing waste materials, such as cast iron dust, can be used as secondary raw materials in the steel and foundry industries. Also, the agglomerates can be used to safely handle, transport, or dispose of finely divided solid waste. Furthermore, agglomerates containing wood products or carbon can be used as fuel sources.

DETAILED DESCRIPTION OF THE INVENTION

As used herein, the term "median particle size," also known as the "mass median diameter," is defined as the particle diameter at which fifty percent by mass of the particles have a larger diameter and fifty percent of the particles by mass have a smaller diameter. Graphically, the median particle size corresponds to the diameter at which the cumulative arithmetic curve (plot of percentage by weight versus particle diameter) intersects the 50% line. Also, the term "powder" refers to a finely divided composition consisting of loose particles that assumes the shape of its container. Further, and by comparison, the term "agglomerate" refers to a cohesive compressed solid having a defined shape, size, and density, comprising a solid particulate dispersed in a solid resin binder.

A siloxane composition according to the present invention comprises from 70 to 99 parts by weight of a solid particulate having a median particle size of from 0.1 to 3000 μm and from 1 to 30 parts by weight of a binder having a median particle size of from 5 to 250 μm, wherein the composition is a powder and the binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, —O=$NR^2R^3$, —$OR^2$, —O—$R^4$—$OR^2$, and an epoxy-substituted organic group, wherein $R^2$ is $C_1$ to $C_8$ hydrocarbyl, $R^3$ is $R^2$ or —H, $R^4$ is hydrocarbylene, w+x+y+z=1, y/(w+x+y+z) is at least 0.67, and the siloxane resin has a softening point of from 30 to 115° C.

The solid particulate can be any particulate that remains a solid under the compressive force used to prepare the agglomerate, described below. The solid particulate typically has a median particle size of from 0.1 to 3000 μm, alternatively from 1 to 1000 μm, alternatively from 10 to 500 μm.

Examples of solid particulates include, but are not limited to, carbon such as graphite, fullerenes (nm dimensions), diamond, carbon black, lamp black, coal, coke, charcoal, and activated carbon; metals, such as chromium, cobalt, copper, iron, manganese, lead, zinc, tungsten, silver, titanium, and nickel; metal alloys such as brass, steel, and bronze; metal sludge; metal oxides such as aluminum oxide, titanium dioxide, magnesium oxide, ferric oxide, beryllium oxide, magnesium oxide, molybdenum trioxide, chromium oxide, titanium oxide, and zinc oxide; metal nitrides such as boron nitride, silicon nitride, and aluminum nitride, metal carbides such as boron carbide, titanium carbide, and silicon carbide; metal carbonates such as calcium carbonate; metal sulfates such as sodium sulfate, potassium sulfate, calcium sulfate, magnesium sulfate, and barium sulfate; molybdenum disulfate; zinc sulfate; metal phosphates such as calcium phosphate; metal halides such as sodium chloride, sodium fluoride, sodium iodide, sodium bromide, and potassium bromide; organic compounds such as urea and dimethyl terephthalate; natural silicas such as crystalline silica (silica sand), ground crystalline silica, and diatomaceous silica; synthetic silicas such as fused silica, silica gel, pyrogenic silica, and precipitated silica; silicates such as mica, wollastonite, feldspar, and nepheline syenite, talc, and asbestos; cement; glasses; wood products such as pulp and sawdust; plastics such as polystyrene, polyurethane, and polyvinyl chloride; detergents; fertilizers; and dried sewage sludge.

The solid particulate can be a single solid particulate or a mixture comprising two or more different solid particulates, each as described above. For example, a siloxane composition according to one embodiment of the invention comprises carbon black, silica sand, and a siloxane resin, described below.

The concentration of the solid particulate is typically from 70 to 99%, alternatively from 80 to 95%, alternatively from 80 to 90%, based on the total weight of the siloxane composition.

The binder has a median particle size of from 5 to 250 μm, alternatively from 25 to 150 μm, alternatively from 25 to 100 μm. The binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, —O=$NR^2R^3$, —$OR^2$, —O—$R^4$—$OR^2$, and an epoxy-substituted organic group, wherein $R^2$ is $C_1$ to $C_8$ hydrocarbyl, $R^3$ is $R^2$ or —H, $R^4$ is hydrocarbylene, w+x+y+z=1, y/(w+x+y+z) is at least 0.67, and the siloxane resin has a softening point of from to 30 to 115° C.

The hydrocarbyl groups represented by $R^1$ typically have from 1 to 10 carbon atoms, alternatively from 1 to 6 carbon atoms, alternatively from 1 to 4 carbon atoms. Acyclic hydrocarbyl groups containing at least three carbon atoms can have a branched or unbranched structure. Examples of hydrocarbyl groups include, but are not limited to, alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; aralkyl, such as benzyl and phenethyl; alkenyl, such as vinyl, allyl, and propenyl; arylalkenyl, such as styryl and cinnamyl; and alkynyl, such as ethynyl and propynyl. In one embodiment of the siloxane composition of the present invention, at least 70 mol % of the groups $R^1$ in the siloxane resin are aryl, for example, phenyl.

The substituted hydrocarbyl groups represented by $R^1$ can contain one or more of the same or different substituents, provided the substituent does not adversely affect the $T_S$ of the siloxane resin or prevent compression of the siloxane composition into an agglomerate, described below. Examples of substituents include, but are not limited to, —OH, —$CO_2H$, —$CO_2R^2$, —OC(=O)$R^2$, —C(=O)$NR^3_2$, —N($R^3$)C(=O)$R^2$, —$NR^3_2$, wherein $R^2$ is $C_1$ to $C_8$ hydrocarbyl and $R^3$ is $R^2$ or —H.

The epoxy-substituted organic groups represented by $R^1$ typically have from 2 to 10 carbon atoms. Examples of epoxy-substituted groups include, but are not limited to, groups having the following formulae:

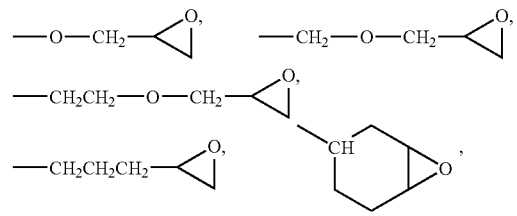

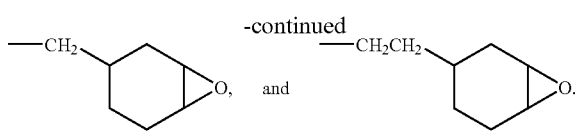

The hydrocarbyl groups represented by $R^2$ and $R^3$ typically have from 1 to 8 carbon atoms, alternatively from 1 to 6 carbon atoms, alternatively from 1 to 4 carbon atoms. Examples of hydrocarbyl groups include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; and aralkyl, such as benzyl and phenethyl.

The hydrocarbylene groups represented by $R^4$ typically have from 1 to 10 carbon atoms, alternatively from 1 to 6 carbon atoms, alternatively 1 to 4 carbon atoms. Examples of hydrocarbylene groups include, but are not limited to, alkylene such as methylene, ethylene, propane-1,3-diyl, 2-methylpropane-1,3-diyl, butane-1,4-diyl, butane-1,3-diyl, pentane-1,5-diyl, pentane-1,4-diyl, hexane-1,6-diyl, octane-1,8-diyl, and decane-1,10-diyl; cycloalkylene such as cyclohexane-14-diyl; arylene such as phenylene In the formula of the siloxane resin, $w+x+y+z=1$, wherein w, x, y, and z are mole fractions. Also, the ratio $y/(w+x+y+z)$ is typically at least 0.67, alternatively at least 0.7, alternatively at least 0.8. When the ratio is less than 0.67, the char yield of the agglomerate typically decreases.

The siloxane resin typically has a softening point, $T_S$, of from 30 to 115° C., alternatively from 35 to 60° C., alternatively from 35 to 50° C., where the softening point is determined using a thermal gravimetric analyzer according to the procedure described in the Examples below. When the softening point of the siloxane resin is less than 30° C., the binder typically is not a powder. When the softening point of the siloxane resin is greater than 115° C., the binder may not readily deform under pressure, without heating, to yield an agglomerate.

The siloxane resin typically has a number-average molecular weight ($M_n$) of from 1000 to 4000, alternatively from 1300 to 3500, alternatively from 1500 to 1900, where the molecular weight is determined by gel permeation chromatography employing a low angle laser light scattering detector.

The siloxane resin typically contains less than 10%, alternatively less than 8%, alternatively less than 6%, of silicon-bonded hydroxy groups, as determined by $^{29}$Si NMR.

The siloxane resin contains units having the formula $R^1SiO_{3/2}$ and, optionally, at least one type of unit having a formula selected from $R^1{}_3SiO_{1/2}$, $R^1{}_2SiO_{2/2}$, and $SiO_{4/2}$. For example, the siloxane resin can consist essentially of (a) $R^1{}_3SiO_{1/2}$ units and $R^1SiO_{3/2}$ units; (b) $R^1{}_3SiO_{1/2}$ units, $R^1SiO_{3/2}$ units, and $SiO_{4/2}$ units; (c) $R^1{}_3SiO_{1/2}$ units, $R^1SiO_{3/2}$ units, and $R^1{}_2SiO_{2/2}$ units; and (d) $R^1{}_2SiO_{2/2}$ units and $R^1SiO_{3/2}$ units; wherein $R^1$ is as defined and exemplified above and the resin has a softening temperature of from 30 to 115° C.

Specific examples of siloxane resins include, but are not limited to, resins having the following formulae:

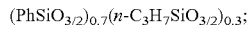

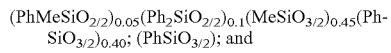

($MeSiO_{3/2}$), where Me is methyl, Ph is phenyl, and the numerical subscripts outside the parenthesis denote mole fractions. Also, in the preceding formulae, the sequence of units is unspecified.

The binder can comprise a single siloxane resin or a mixture of two or more siloxane resins, each as described above.

The concentration of the binder depends on several factors including the type and mean particle size of the solid particulate. Typically, the concentration of the binder in the composition increases as the mean particle size of the solid particulate decreases. The concentration of the binder is typically from 1 to 30%, alternatively from 5 to 20%, alternatively from 10 to 20%, based on the total weight of the siloxane composition.

Methods of preparing siloxane resins are well known in the art; many of these resins are commercially available. Siloxane resins are typically prepared by cohydrolyzing the appropriate mixture of chlorosilane precursors in an organic solvent, such as toluene. For example, a siloxane resin consisting essentially of $R^1{}_3SiO_{1/2}$ units and $R^1SiO_{3/2}$ units can be prepared by cohydrolyzing a compound having the formula $R^1{}_3SiCl$ and a compound having the formula $R^1SiCl_3$ in toluene, where $R^1$ is as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, such —Br, —I, —OCH$_3$, —OC(O)CH$_3$, —N(CH$_3$)$_2$, NHCOCH$_3$, and —SCH$_3$, can be utilized as starting materials in the cohydrolysis reaction. The properties of the resin products depend on the types of silanes, the mole ratio of silanes, the degree of condensation, and the processing conditions.

Furthermore, methods of preparing resins having the formula $(HSiO_{3/2})_n$ are well known in the art as exemplified in U.S. Pat. No. 3,615,272 to Collins et al.; U.S. Pat. No. 5,010,159 to Bank et al.; U.S. Pat. No. 4,999,397 to Frye et al.; U.S. Pat. No. 5,063,267 to Hanneman et al.; U.S. Pat. No. 4,999,397 to Frye et al.; Kokai Patent No. 59-178749; Kokai Patent No. 60-86017; and Kokai Patent No. 63-107122.

The siloxane composition of the instant invention is typically prepared by combining the solid particulate and the binder, and any optional ingredients in the stated proportions at ambient temperature. Mixing can be accomplished by any of the techniques known in the art such as milling, blending, and stirring, either in a batch or continuous process.

An agglomerate according to the present invention comprises from 70 to 99 parts by weight of a solid particulate having a median particle size of from 0.1 to 3000 μm and from 1 to 30 parts by weight of a binder having a median particle size of from 5 to 250 μm, wherein the binder comprises a siloxane resin having the formula: $(R^1{}_3SiO_{1/2})_w(R^1{}_2SiO_{2/2})_x(R^1SiO_{3/2})_y(SiO_{4/2})_z$, wherein each $R^1$ is independently selected from hydrogen, hydrocarbyl, substituted hydrocarbyl, —O=NR$^2$R$^3$, —OR$^2$, —O—R$^4$—OR$^2$, and an epoxy-substituted organic group, wherein $R^2$ is $C_1$ to $C_8$ hydrocarbyl, $R^3$ is $R^2$ or —H, $R^4$ is hydrocarbylene, $w+x+y+z=1$, $y/(w+x+y+z)$ is at least 0.67, and the siloxane resin has a softening point of from 30 to 115° C.

The solid particulate and the binder of the agglomerate are as described and exemplified above for the siloxane composition of the present invention.

The agglomerate can have a variety of shapes and sizes, depending on the method used to produce it, described below.

For example, the agglomerate can have the form of a briquette, a sheet, a pellet, or some other shaped article.

The agglomerate of the present invention can be prepared by compressing a siloxane composition to form an agglomerate, wherein the composition comprises from 70 to 99 parts by weight of a solid particulate having a median particle size of from 0.1 to 3000 μm and from 1 to 30 parts by weight of a binder having a median particle size of from 5 to 250 μm, wherein the composition is a powder and the binder comprises a siloxane resin having the formula: $(R^1{}_3SiO_{1/2})_w$ $(R^1{}_2SiO_{2/2})_x(R^1SiO_{3/2})_y(SiO_{4/2})_z$, wherein each $R^1$ is independently selected from hydrogen, hydrocarbyl, substituted hydrocarbyl, $-O-NR^2R^3$, $-OR^2$, $-O-R^4-OR^2$, and an epoxy-substituted organic group, wherein $R^2$ is $C_1$ to $C_8$ hydrocarbyl, $R^3$ is $R^2$ or $-H$, $R^4$ is hydrocarbylene, $w+x+y+z=1$, $y/(w+x+y+z)$ is at least 0.67, and the siloxane resin has a softening point of from 30 to 115° C. The siloxane composition of the present method is as described and exemplified above.

The siloxane composition can be compressed using conventional equipment, such as a roll press (e.g., briquetter or compactor), an extruder, and a stamp and die. For example, a double roll press is typically used to produce sheets or briquettes, whereas an extruder is typically used to produce pellets. A stamp and die can be used to produce agglomerates having a variety of shapes and sizes.

The siloxane composition is compressed using a pressure sufficient to form the agglomerate of the instant invention. The compression pressure depends on several factors, including the composition and size of the solid particulate; the composition, size, and softening point of the siloxane resin; and the type of apparatus use to compress the composition. The siloxane composition is typically compressed using a gauge pressure of from 3.4 to 136 MPa, alternatively from 6.8 to 102 MPa, alternatively from 34 to 68 MPa, where the term "gauge pressure" refers to a pressure reading that uses the actual atmospheric pressure as the zero point. The optimum pressure for a particular siloxane composition and apparatus can be readily determined by routine experimentation.

The method can further comprise, before the step of compressing, feeding the siloxane composition into a die or the rollers of a roll press. The composition can be fed using a screw feeder or a gravity feeder. Screw feeders provide the advantage of precompacting and deaerating the incoming material for higher infeed densities. They can also crush infeed particles to achieve a more favorable size consistency before compacting. In some cases, heat generated by the screw feeding process may be beneficial, for example, by softening the binder prior to agglomeration. Also, when the siloxane resin has a moderate to high softening point, for example at least 50° C., it may be desirable to heat the feeder and/or rollers to a temperature near the softening point of the resin, for example within 10° C. of the softening point, to facilitate agglomeration.

The siloxane composition of the present invention can be compressed into an agglomerate having a variety of shapes and sizes. The composition contains a siloxane resin binder that has a softening point ($T_S$) well above room temperature. Consequently, the binder, which has the form of a powder at room temperature, softens under compression to form an agglomerate of the solid particulate. Also, compared to conventional organic binders, such as coal tar, clay, starch, waxes, and lignin waste, the siloxane resin binder of the siloxane composition has very low content of impurities, for example metals, boron and phosphorus. Further, compared to organic binders, the siloxane resin binder has high char yield and provides a high strength bond with the solid particulate when heated above its decomposition temperature.

The agglomerate of the present invention has sufficient green strength to permit transportation and handling. Also, the agglomerate can have a variety of shapes and sizes, Further, when heated above the decomposition temperature of the siloxane resin binder, approximately 500° C., the agglomerate maintains its shape and has high bond strength, making it suitable for use in high temperature smelting processes.

The method of preparing the agglomerate can be conveniently carried out using conventional equipment, such as roll presses, for example compacting and briquetting systems, stamps and dies, and pellet mills. In particular, roll presses are suitable for the high capacity production of agglomerates. The method can be used to produce agglomerates having a variety of shapes, for example briquettes, sheets, and pellets, depending on the selection of equipment. Also, the method can be carried out without the aid of solvent, external heating, or post-compression drying. Importantly, the method can be used to recover solid particulate waste products from manufacturing processes.

The agglomerates of the present invention have numerous uses, depending on the nature of the solid particulate. In particular, the agglomerates can be used as sources of raw materials in manufacturing processes. For example, agglomerates containing waste materials, such as cast iron dust, can be used as secondary raw materials in the steel and foundry industries. Also, the agglomerates can be used to safely handle, transport, or dispose of finely divided solid waste. Furthermore, agglomerates containing wood products or carbon can be used as fuel sources.

EXAMPLES

The following examples are presented to better illustrate the siloxane composition, agglomerate, and method of the present invention, but are not to be considered as limiting the invention, which is delineated in the appended claims. Unless otherwise noted, all parts and percentages reported in the examples are by weight. The following methods and materials were employed in the examples:

Unground Silica, which is available from US. Silica (Berkeley Springs, W. Va.) under the name Fine Melt, is silicon dioxide (99.8%) having a median particle size (by mass) of 250 μm, a hardness (Mohs) of 7, a melting point of 1704° C., and specific gravity of 2.65.

Ground Silica, which is available from US. Silica (Berkeley Springs, W. Va.) under the trademark SIL-CO-SIL 250, is silicon dioxide (99.8%) having a median particle size (by mass) of 45 μm, a median Mesh size of 325 (USA Standard Sieve), a hardness (Mohs) of 7, a melting point of 1704° C., and specific gravity of 2.65.

Carbon Black A, which is available from Cancarb Ltd. (Alberta, Canada) under the trade name Thermax Florform N-990, consists of pellets of carbon having a sieve residue (325 Mesh max., % (ppm)) of 0.0015, a nitrogen surface area of 7-12 m²/g, a DBP (dibutyl phthalate) absorption of 44 cm³/g max, an ash content of 0.2%, a pH of 9-11, and an average maximum pellet hardness (14×18 mesh) of 30 g.

Carbon Black B, which is available from Cabot Corporation (Alpharetta, Ga.) under the trademark REGAL 85, is a low surface area, low structure furnace carbon black having a nitrogen surface area of 21 m²/g, an iodine number of 21 mg/g, and a DBP (Dibutyl Phthalate) absorption of 34 ml/100 g.

Carbon Black C, which is available from Cabot Corporation (Alpharetta, Ga.) under the trademark STERLING NS-1, is a pelleted furnace carbon black having a nitrogen surface area of 31 m$^2$/g, an iodine number of 28 mg/g, and a DBP (Dibutyl Phthalate) absorption of 64 ml/100 g.

Carbon Black D, which is available from Cabot Corporation (Alpharetta, Ga.) under the trademark STERLING V, is a semi-reinforcing grade carbon black having a nitrogen surface area of 35 m$^2$/g, an iodine number of 36 mg/g, and a DBP (Dibutyl Phthalate) absorption of 90 ml/100 g.

Binder is a siloxane resin powder having the formula (Ph-SiO$_{3/2}$)$_{0.7}$(n-C$_3$H$_7$SiO$_{3/2}$)$_{0.3}$, wherein the resin has a softening point of 40° C., a median particle size of 150 μm, a weight-average molecular weight (M$_w$) of 2900, a number-average molecular weight (M$_n$) of 1700, and contains about 6% (w/w) of silicon-bonded hydroxy groups. The powder was prepared by pulverizing lumps of solid resin using a coffee grinder or a pin mill (Munson Machinery Company, Inc., Utica, N.Y.). The unpulverized Binder is available from Dow Corning Corporation (Midland, Mich.) under the name Dow Corning 208 Flake Resin.

The softening point of the Binder was determine using a DuPont Model 941 Thermomechanical Analyzer according to the following procedure: A flat test specimen of the Binder having a thickness of 0.5 to 2.0 mm was prepared by placing the pulverized resin in an aluminum weighing pan, heating the resin to a temperature just above the melting point, and then cooling the resin to room temperature. The system was continuously purged with nitrogen at a flow rate of 10 mL-min. The heater was placed over the quartz sample housing and the temperature of the system was adjusted to a value at least 15° C. below the expected softening point of the Binder. The heater was removed and the test specimen was placed under a quartz rod probe having a diameter of 2.5 to 3.0 mm, a mass of 10±2 g, and a hemispherical tip having a diameter equal to the diameter of the rod. The heater was replaced and the displacement detector was adjusted for a displacement of 0.012±0.002 mm. The sample was heated at a rate of 1° C./min. The temperature at which the displacement equals 0.012 mm is recorded as the softening point.

The siloxane compositions of Examples 1-13 were prepared by combining the components specified in Table 1 in a glass jar. The contents were then shaken vigorously by hand for approximately 1 min. The siloxane composition of Example 14 was prepared by combining the components specified in Table 1 in a 5-gallon pail. The contents were then blended using a drum roller.

Median particle size (based on mass) of silica and binder was measured using a Beckman Coulter LS 230 Laser Diffraction Particle Size Analyzer (Beckman Coulter, Inc., Fullerton, Calif.).

Compression strength of charred briquettes was measured using a Sintech 1/S Test System (MTS Systems Corporation, Cary, N.C.). Reported values for compression strength represent the average results for three briquettes prepared from the same composition.

Porosity of charred briquettes was determined using a QuantaChrome MPY-2 Helium Pycnometer (QuantaChrome Instruments, Boynton Beach, Fla.). Reported values for porosity represent the average results for three briquettes prepared from the same composition.

Density of charred cylindrical briquettes was determined by measuring the mass and volume of the briquettes. The volume of the briquettes was calculated using the relation V=πr$^2$h, where V is volume in cm$^3$, r is radius in cm, and h is height in cm. Because the volume includes pore volume as well as particle volume, the resultant density is sometimes referred to as the "bulk density." Reported values for density represent the average results for three briquettes prepared from the same composition.

Char yield of the Binder was determined by using the relation: Char Yield=mass of briquette after char/mass of briquette before char×100. In this calculation, the loss in mass of the briquette after char is assumed to be due solely to the Binder. Reported values for char yield represent the average results for three briquettes prepared from the same composition.

Examples 1-13

In each of Examples 1-13, charred briquettes were prepared using each of the siloxane compositions specified in Table 1. The composition (2.8 g) was compressed in a plunger/compactor under a force of 5000 lbf (22,241 N) using a hydraulic press to form cylindrical briquettes having a diameter of 1.91 cm and a height of 0.81 cm. The briquettes were then charred in a Lindberg tube furnace at 750° C. for 2 h in an atmosphere of flowing nitrogen. The physical properties of the charred briquettes are shown in Table 2.

Example 14

Briquettes were prepared by compressing the siloxane composition specified in Table 1 in a Komarek DH-100 Briquetting Machine using a screw speed of 2.5 rpm and a roller gauge pressure 6.89 MPa (1000 psig). Three briquettes were kept at room temperature; three briquettes were heated in air at 175° C. for 30 min.; and three briquettes were heated in air at 215° C. for 30 min. Each briquette was dropped from a height of 2.44 m onto a hard surface (linoleum-covered concrete floor). The fragments were collected and sieved through a screen containing circular apertures having a diameter of 6 mm. The percentage retained on the screen was calculated for each briquette according to the relation:

% Rretained=mass of fragments retained on screen/initial mass of briquette×100.

The average % Retained values for the briquettes kept at room temperature, the briquettes heated at 175° C., and the briquettes heated at 215° C. were 98±2, 99±2, and 99±4.

TABLE 1

| Component | Example/Amount of Component, %(w/w) | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Carbon black | | | | | | | | | | | | | | |
| Thermax N990 | 80 | 100 | 90 | 80 | 75 | 70 | — | — | — | — | — | — | — | — |
| Regal 85 | — | — | — | — | — | — | 45 | 45 | — | — | 80 | — | — | 44 |

TABLE 1-continued

| Component | \multicolumn{14}{c}{Example/Amount of Component, %(w/w)} | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Sterling NS-1 | — | — | — | — | — | — | — | — | — | — | — | 80 | — | — |
| Sterling V | — | — | — | — | — | — | — | — | — | — | — | — | 80 | — |
| Silica Sand | | | | | | | | | | | | | | |
| Unground Silica | 10 | — | 10 | 10 | 10 | 10 | 45 | — | 90 | — | 10 | 10 | 10 | 44 |
| Ground Silica | — | — | — | — | — | — | — | 45 | — | 90 | — | — | — | — |
| Binder | 10 | — | — | 10 | 15 | 20 | 10 | 10 | 10 | 10 | 10 | 10 | 10 | 12 |

— Denotes absence of a component.

TABLE 2

| Example | Compression Strength, lbf | Porosity, % | Density, g/cm³ | Char Yield, % |
|---|---|---|---|---|
| 1 | 718.0 ± 200.2 | — | — | — |
| 2 | 82.6 ± 13.4 | — | — | — |
| 3 | 100.9 ± 13.4 | — | — | — |
| 4 | 716.0 ± 117.8 | — | — | — |
| 5 | 826.1 ± 105.3 | — | — | — |
| 6 | 644.3 ± 74.9 | — | — | — |
| 7 | 397.2 ± 40.3 | 42.79 | — | 96.2 |
| 8 | 554.7 ± 88.2 | — | — | 96.4 |
| 9 | 818.8 ± 48.7 | 30.69 ± 0.07 | — | 97.2 |
| 10 | 986.8 ± 15.6 | 31.92 ± 0.56 | — | 97.2 |
| 11 | 935.8 | 36.24 | 1.223 | — |
| 12 | 420.9 | 50.61 | 0.953 | — |
| 13 | 174.5 | 60.91 | 0.745 | — |

— Denotes property not determined.

That which is claimed is:

1. A siloxane composition, comprising from 70 to 99 parts by weight of a solid particulate having a median particle size of from 0.1 to 3000 μm and from 1 to 30 parts by weight of a binder having a median particle size of from 5 to 250 μm, wherein the composition is a powder and the binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, —O=$NR^2R^3$, —$OR^2$, —O—$R^4$—$OR^2$, and an epoxy-substituted organic group, wherein $R^2$ is $C_1$ to $C_8$ hydrocarbyl, $R^3$ is $R^2$ or —H, $R^4$ is hydrocarbylene, w+x+y+z=1, y/(w+x+y+z) is at least 0.67, at least 70 mol % of the groups $R^1$ in the siloxane resin are aryl, and the siloxane resin has a softening point of from 30 to 115° C.

2. The siloxane composition according to claim 1, wherein the solid particulate is carbon black.

3. The siloxane composition according to claim 1, wherein the solid particulate is a mixture of carbon black and silica sand.

4. The siloxane composition according to claim 1, wherein the siloxane resin consists essentially of $R^1SiO_{3/2}$ units, wherein each $R^1$ is independently selected from hydrogen, hydrocarbyl, substituted hydrocarbyl, —O=$NR^2R^3$, —$OR^2$, —O—$R^4$—$OR^2$, and an epoxy-substituted organic group, wherein $R^2$ is $C_1$ to $C_8$ hydrocarbyl, $R^3$ is $R^2$ or —H, and $R^4$ is hydrocarbylene.

5. The siloxane composition according to claim 1, wherein the siloxane resin consists essentially of $PhSiO_{3/2}$ units and $n$-$C_3H_7SiO_{3/2}$ units.

6. An agglomerate, comprising from 70 to 99 parts by weight of a solid particulate having a median particle size of from 0.1 to 3000 μm and from 1 to 30 parts by weight of a binder having a median particle size of from 5 to 250μm, wherein the binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, —O=$NR^2R^3$, —$OR^2$, —O—$R^4$—$OR^2$, and an epoxy-substituted organic group, wherein $R^2$ is $C_1$ to $C_8$ hydrocarbyl, $R^3$ is $R^2$ or —H, $R^4$ is hydrocarbylene, w+x+y+z=1, y/(w+x+y+z) is at least 0.67, at least 70 mol % of the groups $R^1$ in the siloxane resin are aryl, and the siloxane resin has a softening point of from 30 to 115° C.

7. The agglomerate according to claim 6, wherein the agglomerate has a form selected from a briquette, a sheet, and a pellet.

8. The agglomerate according to claim 6, wherein the solid particulate is carbon black.

9. The agglomerate according to claim 6, wherein the solid particulate is a mixture of carbon black and silica sand.

10. The agglomerate according to claim 6, wherein the siloxane resin consists essentially of $R^1SiO_{3/2}$ units, wherein each $R^1$ is independently selected from hydrogen, hydrocarbyl, substituted hydrocarbyl, —O=$NR^2R^3$, —$OR^2$, —O—$R^4$—$OR^2$, and an epoxy-substituted organic group, wherein $R^2$ is $C_1$ to $C_8$ hydrocarbyl, $R^3$ is $R^2$ or —H, and $R^4$ is hydrocarbylene.

11. A method of preparing an agglomerate, comprising compressing a siloxane composition to form an agglomerate, wherein the composition comprises from 70 to 99 parts by weight of a solid particulate having a median particle size of from 0.1 to 3000 μm and from 1 to 30 parts by weight of a binder having a median particle size of from 5 to 250 μm, wherein the composition is a powder and the binder comprises a siloxane resin having the formula: $(R^1_3SiO_{1/2})_w(R^1_2SiO_{2/2})_x(R^1SiO_{3/2})_y(SiO_{4/2})_z$, wherein each $R^1$ is independently selected from hydrogen, hydrocarbyl, substituted hydrocarbyl, —O=$NR^2R^3$, —$OR^2$, —O—$R^4$—$OR^2$, and an epoxy-substituted organic group, wherein $R^2$ is $C_1$ to $C_8$ hydrocarbyl, $R^3$ is $R^2$ or —H, $R^4$ is hydrocarbylene, w+x+y+z=1, y/(w+x+y+z) is at least 0.67, at least 70 mol % of the groups $R^1$ in the siloxane resin are aryl, and the binder has a softening point of from 30 to 115° C.

12. An agglomerate prepared according to the method of claim 11.

13. The method according to claim 11, wherein the solid particulate is carbon black.

14. The method according to claim 11, wherein the solid particulate is a mixture of carbon black and silica sand.

15. The agglomerate according to claim 11, wherein the siloxane resin consists essentially of $R^1SiO_{3/2}$ units, wherein each $R^1$ is independently selected from hydrogen, hydrocarbyl, substituted hydrocarbyl, —O=$NR^2R^3$, —$OR^2$, —O—$R^4$—$OR^2$, and an epoxy-substituted organic group, wherein $R^2$ is $C_1$ to $C_8$ hydrocarbyl, $R^3$ is $R^2$ or —H, and $R^4$ is hydrocarbylene.

* * * * *